United States Patent [19]

Ishimaki et al.

[11] Patent Number: 5,018,796
[45] Date of Patent: May 28, 1991

[54] HYDRAULIC PRESSURE CONTROL VALVE

[75] Inventors: Takashi Ishimaki, West Bloomfield, Mich.; Toshio Simura, Yamanashi, Japan

[73] Assignee: Tokico Ltd., Kanagawa, Japan

[21] Appl. No.: 522,123

[22] Filed: May 11, 1990

[30] Foreign Application Priority Data

May 16, 1989 [JP] Japan ............... 1-55940[U]

[51] Int. Cl.$^5$ ............................................ B60T 8/26
[52] U.S. Cl. ........................................ 303/9.75; 188/349
[58] Field of Search ............ 303/9.62, 9.64, 9.65, 303/9.66, 9.67, 9.68, 9.69, 9.71, 9.72, 9.73, 9.74, 9.75, 9.63; 188/349; 60/591; 137/505.25

[56] References Cited

U.S. PATENT DOCUMENTS

| | | | |
|---|---|---|---|
| 3,612,618 | 10/1971 | Swanson | 303/9.75 X |
| 4,669,268 | 6/1987 | Takeuchi et al. | 303/9.75 X |
| 4,774,809 | 10/1988 | Hayashida et al. | 303/9.75 X |
| 4,809,505 | 3/1989 | Kamemoto et al. | 303/9.63 X |
| 4,833,885 | 5/1989 | Fulmer | |
| 4,893,878 | 1/1990 | Cole et al. | 303/9.75 |

FOREIGN PATENT DOCUMENTS 61-6056   1/1986   Japan.
62-36860  3/1987   Japan.
63-61373  4/1988   Japan.

*Primary Examiner*—Douglas C. Butler
*Attorney, Agent, or Firm*—Wenderoth, Lind & Ponack

[57] ABSTRACT

A hydraulic pressure control valve for use in a brake system of a vehicle includes a valve member having a first projection which extends into an annular groove, in which a sealing member is disposed, when the valve member is at a predetermined position. Either the valve member or a cap that is disposed at an inlet port of the valve has a second projection through which the valve member can abut against the cap when the valve member moves toward the cap. The dimensions of the first and second projections are determined so that the distal end of the first projection is positioned so as to prevent the sealing member from coming out of the annular groove even when the valve member abuts against the cap. Thus, the sealing member is surely prevented from coming out of the annular groove when the hydraulic pressure control valve is assembled to the vehicle body, or when it is reassembled after being overhauled.

6 Claims, 3 Drawing Sheets

HYDRAULIC PRESSURE CONTROL VALVE

BACKGROUND OF THE INVENTION

1. Field of the Invention

The present invention relates to a hydraulic pressure control valve which is provided in a brake system of a vehicle.

2. Description of the Prior Art

Generally, a hydraulic pressure control valve that is provided in a brake system of a vehicle is designed to lower the rate of increase in hydraulic pressure supplied from a master cylinder to a brake cylinder associated with a rear wheel, when the hydraulic pressure exceeds a predetermined level, thereby preventing a locking of the wheel.

One type of conventional hydraulic pressure control valve which has heretofore been arranged to prevent a built-in sealing member from coming off when the control valve is assembled to a vehicle or is reassembled after overhauling, is disclosed in Japanese Utility Model Public Disclosure (KOKAI) No. 63-61373.

Referring to FIG. 1, which illustrates the above-described prior art valve a hydraulic pressure control valve 1 has a body 2 that is provided with a bore having a small-diameter bore portion 4 that is formed at the side which is closer to an inlet port 3, and a sealing member 8 is disposed within an annular groove 7, which is defined between the small-diameter bore portion 4 and a small-diameter portion 6 of a stepped piston 5. The small-diameter bore portion 4 has the diameter at the open end thereof reduced by an annular inward projection 9.

With this structure, the sealing member 8 is prevented from coming out of the groove 7 during the evacuation of air when brake fluid is charged into the brake system, and it is also possible to prevent the sealing member 8 from being pushed out of the groove 7 by the small-diameter portion 6 of the piston 5 when the control valve 1 is reassembled after overhauling.

This conventional hydraulic pressure control valve 1 suffers, however, from the following problems.

The small-diameter bore portion 4 in the body 2, within which the sealing member 8 is disposed, is generally formed by cutting, and this cutting the body 2, process is necessarily complicated in order to form the annular inward projection 9 for preventing the detachment of the sealing member 8. In addition, the inner side of the small-diameter bore portion 4 must be finished to a smooth surface in order to ensure satisfactory sealing properties, and for this cutting operation a special tool must be employed due to the obstruction presented by the projection 9. For these reasons, the equipment costs are high, and the machining time is relatively long. Consequently, productivity in the manufacture of the valve is relatively low accompanied by a rise in production costs.

SUMMARY OF THE INVENTION

In view of the above-described problems of the prior art, it is an object of the present invention to provide a hydraulic pressure control valve which is designed to prevent the sealing member from coming out of the annular groove which does not require complicated and time consuming operations and its manufacture which normally contribute to low manufacturing productivity.

The hydraulic pressure control valve according to the present invention comprises: a body that is provided with a bore having an inlet port and an outlet port at opposite ends thereof, respectively, the inlet port being connected to a master cylinder, the outlet port being connected to a brake cylinder, the body being attached to either the master cylinder or a pipe for the master cylinder at a connecting portion that is provided on the outer periphery of the inlet port; a piston that is axially slidably disposed within the bore, the piston having a small-diameter portion which is disposed at the inlet port side, a large-diameter portion which is disposed at the outlet port side, and a communicating bore which places the inlet and outlet ports in communication and the piston being constantly biased toward the outlet port by a biasing device; a sealing member that is disposed in an annular groove which is defined between the small-diameter portion of the piston and the inner wall of the bore; a valve member that is disposed within a valve chamber which is formed adjacent to the inlet port of the bore, the valve member being biased by a biasing device so as to be normally held at a predetermined position, and the valve member being moved into and out of contact with the distal end of the small-diameter portion of the piston in response to the movement of the piston to close and open the communicating bore; and a cap that is secured to the outer periphery of the body at the inlet port, the cap having a through-bore. The valve member has a first projection which extends into the annular groove when the valve member is at the predetermined position, and at least either the valve member or the cap has a second projection through which the valve member can abut against the cap when the valve member moves toward the cap, the dimensions of the first and second projections being determined so that the distal end of the first projection is at a position where it is capable of preventing the sealing member from coming out of the annular groove even when the valve member abuts against the cap.

In one embodiment of the present invention, the cap is undetachably secured to the body.

In one embodiment of the present invention, a flange which has a diameter smaller than the outer diameter of the connecting portion is formed on the outer periphery of the body at the end portion of the inlet port, the cap being secured to the flange by caulking.

By virtue of the above-described arrangement, even when the second projection, which is formed on either the valve member or the cap, abuts against the cap or valve member, the distal end of the first projection is at a position where it is capable of preventing the sealing member from coming out of the annular groove, which is defined between the bore in the body and the stepped piston. Thus, the sealing member is prevented from coming out of the annular groove when the hydraulic pressure control valve is assembled to the vehicle body, or when it is reassembled after overhauling, provided that the valve member has already been assembled to the control valve.

Since it is only necessary to provide the cap at the inlet port that is formed in the body and to provide the second projection on either the valve member or the cap, the machining process is facilitated and no high dimensional accuracy is required. Thus, it is possible to shorten the time needed for carrying out the machining process. In addition, since no complicated machining process is required, productivity is increased. It is also possible to effect a reduction in the cost of equipment.

If the cap is secured to the outer periphery of the body by means of caulking, no foreign substances, which would otherwise be likely accumulate, will enter the inlet port in which the valve member is accommodated, when the cap is attached to the body. There is therefore no possibility of foreign substances impairing the function of the valve member or the sealing properties of the sealing member. In the arrangement wherein the cap is secured to the outer periphery of the body by caulking, when the hydraulic pressure control valve is removed from the master cylinder for overhauling, the inlet port side of the control valve is not disassembled. The sealing member is therefore held within the annular groove at all times during the disassembly and reassembly of the control valve.

BRIEF DESCRIPTION OF THE DRAWINGS

The above and other objects, features and advantages of the present invention will become more apparent from the following description of the preferred embodiments thereof, taken in conjunction with the accompanying drawings, in which like reference numerals denote like elements, and of which.

DETAILED DESCRIPTION OF THE PREFERRED EMBODIMENTS

Figure 1:
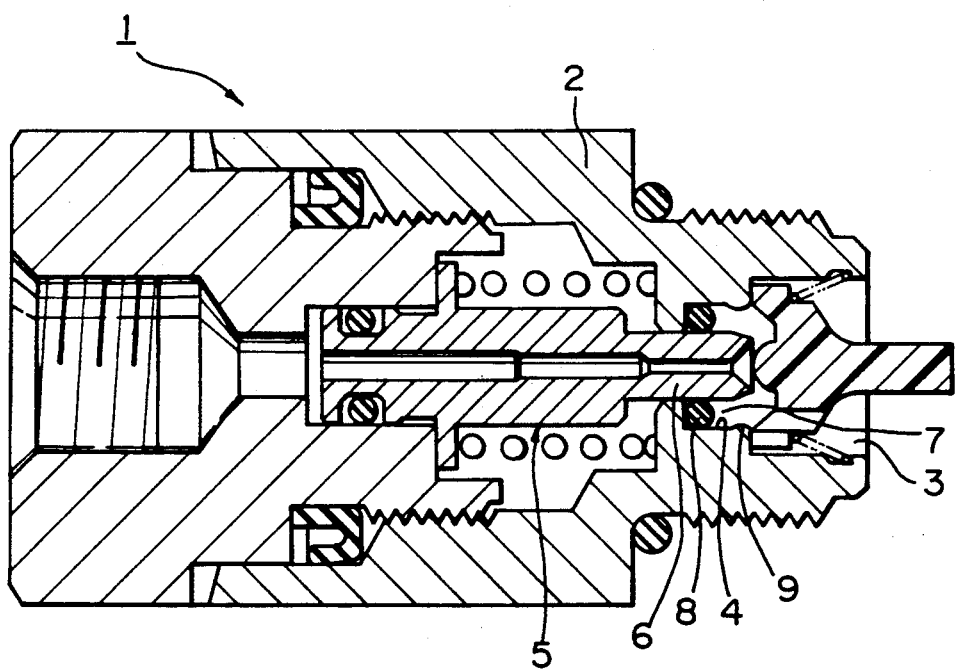
FIG. 1 is a longitudinal sectional view of one example of a conventional hydraulic pressure control valve.
Figure 2:
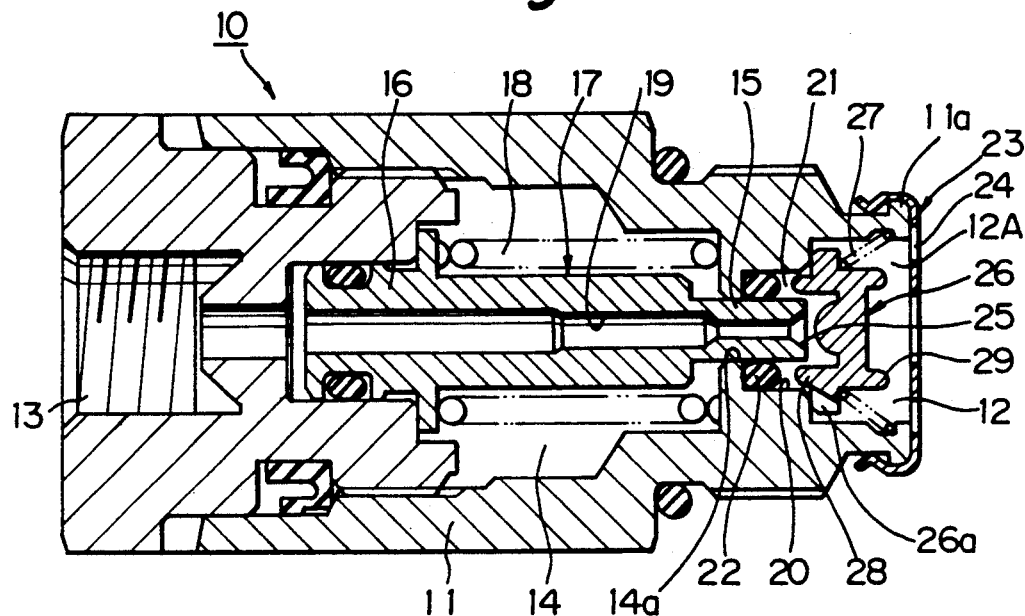
FIG. 2 is a longitudinal sectional view of a first embodiment of the hydraulic pressure control valve according to the present invention.
Figure 3:
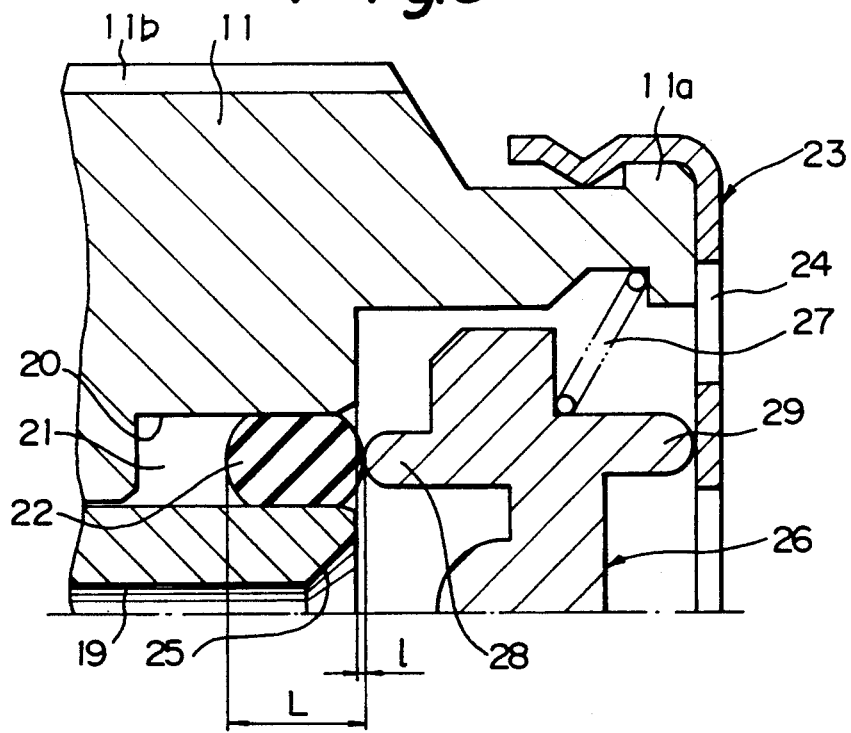
FIG. 3 is an enlarged view of an essential part of the embodiment shown in FIG. 2.

A first embodiment of the hydraulic pressure control valve according to the present invention will be described below with reference to FIGS. 2 and 3. FIG. 2 is a longitudinal sectional view showing the general arrangement of this embodiment, and FIG. 3 is an enlarged view of an essential part of the arrangement shown in FIG. 2.

The body 11 of a hydraulic pressure control valve 10 is provided with a bore 14 having an inlet port 12 and an outlet port 13 at opposite ends thereof, respectively. The inlet port 12 is connected through a pipe to a master cylinder (not shown) or directly thereto in such a manner that a threaded portion which is formed on the outer periphery of the inlet port 12 is in threaded engagement with a boss portion of the master cylinder. The outlet port 13 is connected through a pipe to a brake cylinder (not shown) of a brake which is provided on a wheel.

A stepped piston 17 is slidably received in the bore 14 in such a manner that a small-diameter portion 15 of the piston 17 is disposed at the side which is closer to the inlet port 12, and a large-diameter portion 16 at the side which is closer to the outlet port 13. The piston 17 is constantly biased toward the outlet port 13 by a spring member 18. The piston 17 is provided with an axially extending communicating bore 19 which places the inlet and outlet ports 12 and 13 in communication.

The bore 14 has a guide bore portion 14a which slidably guides the small-diameter portion 15 of the piston 17 near the inlet port 12. In addition, a bore portion 20, which has a larger diameter than that of the guide bore portion 14a, is formed adjacent to the guide bore portion 14a. The inner wall of the body 11 defining bore portion 20 and the outer surface of the small-diameter portion 15 of the piston 17 define an annular groove 21 therebetween, in which is fitted a sealing member 22 that seals the area between the piston 17 and the guide bore portion 14a.

A cap 23 which is in the form of a short cylinder is attached to the end of the body 11 which is closer to the inlet port 12 in such a manner that the cap 23 is engaged with a flange portion 11a which is formed on the outer periphery of the body 11, the cap 23 being secured by means of caulking at several portions thereof which are spaced circumferentially. The cap 23 is provided with a communicating bore 24 which places the master cylinder and the inlet port 12 in communication.

The cap 23 defines a chamber 12A which leads to the inlet port 12. In the chamber 12A is disposed a valve member 26 which normally rests on and separates but is seperable from from a valve seat that is formed at that end of the communicating bore 19 extending in the piston 17 which faces the inlet port 12. The valve member 26 is constantly biased toward the valve seat 25 by a spring member 27. Normally, the valve member 26 is held in the position shown in FIG. 2. The valve member 26 is provided in the outer periphery thereof with a notch 26a which places the inlet port 12 and the communicating bore 19 in communication when the valve member 26 is in the position shown in FIG. 2. The valve member 26 is formed with a stopper projection 28 which projects toward the annular groove 21. On the opposite side of the valve member 26 with respect to the stopper projection 28 is formed a positioning projection 29 which is capable of abutting the cap 23 when the valve member 26 moves toward the cap 23. It should be noted that these projections 28 and 29 may be provided either as annular or partially annular elements. The positioning projection 29 may be disposed at any position in the radial direction of the valve member 26 as long as it can abut against the cap 23.

The respective heights of the projections 28 and 29 are set so that the distal end of the stopper projection 28 is at a position where it is capable of preventing the sealing member 22 from coming out of the annular groove 21 even when the positioning projection 29 abuts against the cap 23, and also before the former comes into contact with the latter, as shown in FIG. 3. It is preferable to set the heights of the projections 28 and 29 so that the distance l between the open end of the groove 21 in the body 11 and the distal end of the stopper projection 28 when the positioning projection 29 abuts against the cap 23 is less than half the length L of the sealing member 22. The present invention is, however, not necessarily limited thereto.

The following is a description of the function of the hydraulic pressure control valve 10 having the foregoing arrangement.

In the manufacture of the hydraulic pressure control valve 10, the cap 23 is secured to the body 11 after the valve member 26 has been assembled therein. At this time, since the cap 23 is attached to the outer periphery of the body 11 by means of caulking, the occurrence of foreign substances, such as metallic dust, is limited, and no foreign substances will enter the inlet port 12. There is therefore no adverse effect on the operation of the valve member 26 and the sealing properties of the sealing member 22.

When a brake fluid is to be charged after the hydraulic pressure control valve 10 has been assembled to the vehicle body, air is evacuated, and during the evacuation of air, the sealing member 22 may be moved in a direction towards the open end of the annular groove 21 by the negative pressure that is produced at the inlet port side. Also, when the hydraulic pressure control valve 10 is reassembled after overhauling, the small-diameter portion 15 of the stepped piston 17 may tend to move the sealing member 22 out of the groove 21. In these cases, however, the positioning projection 29 that is formed on the valve member 26 abuts the cap 23, so that the sealing member 22 is retained by the distal end of the stopper projection 28 and is prevented from coming out of the annular groove 21.

The above-described arrangement only necessitates providing the stopper projection 28 and the positioning projection 29 on the valve member 26, and projections 28 and 29 need not be formed with high dimensional accuracy. Accordingly, the ability to mass-produce the control valve mass-productivity is not limited.

The operation of the hydraulic pressure control valve 10 will next be briefly described.

The hydraulic pressure that is produced in the master cylinder is introduced into the brake cylinder through the inlet port 12, the notch 26a, the communicating bore 19 in the stepped piston 17 and the outlet port 13. When the hydraulic pressure at the master cylinder side rises to a predetermined level, the piston 17 moves toward the inlet port 12 against the biasing force of the spring member 18 due to the difference in the area between the large- and small-diameter portions 16 and 15 of the piston 17 that are subjected to the pressure. As a result, the valve member 26 normally rests on the valve seat 25 that is formed at the end of the communicating bore 19 in the piston 17, thus cutting off the inlet port 12 from the communicating bore 19. However, by such action of piston 17, the valve member 26 repeatedly is moved to rest on and seperate from the valve seat 25 in response to an increase in the hydraulic pressure at the master cylinder side, thus lowering the rate of increase in the hydraulic pressure at the brake cylinder side.

Figure 4:
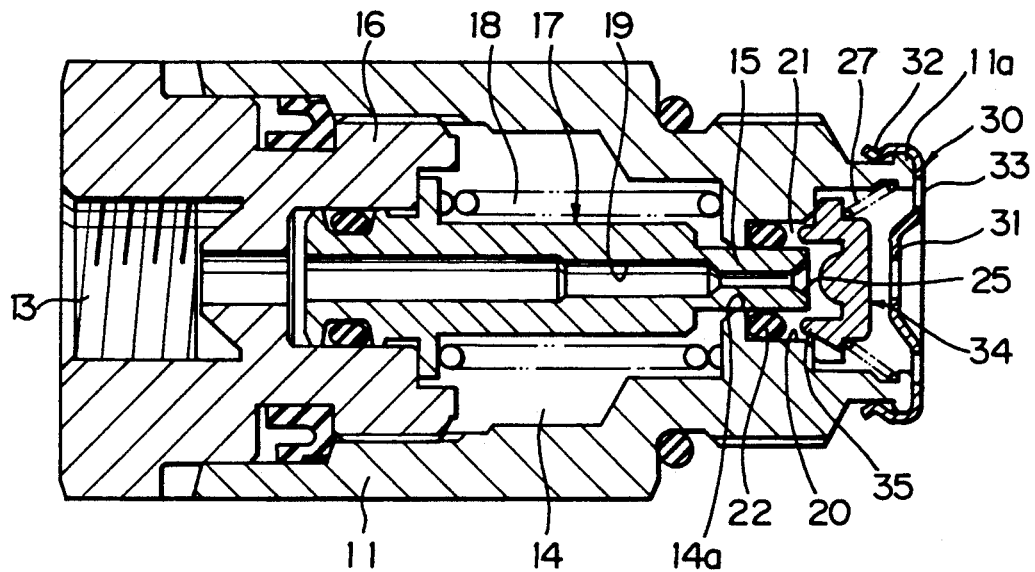
FIG. 4 is a longitudinal sectional view of a second embodiment of the hydraulic pressure control valve according to the present invention.
Figure 5:
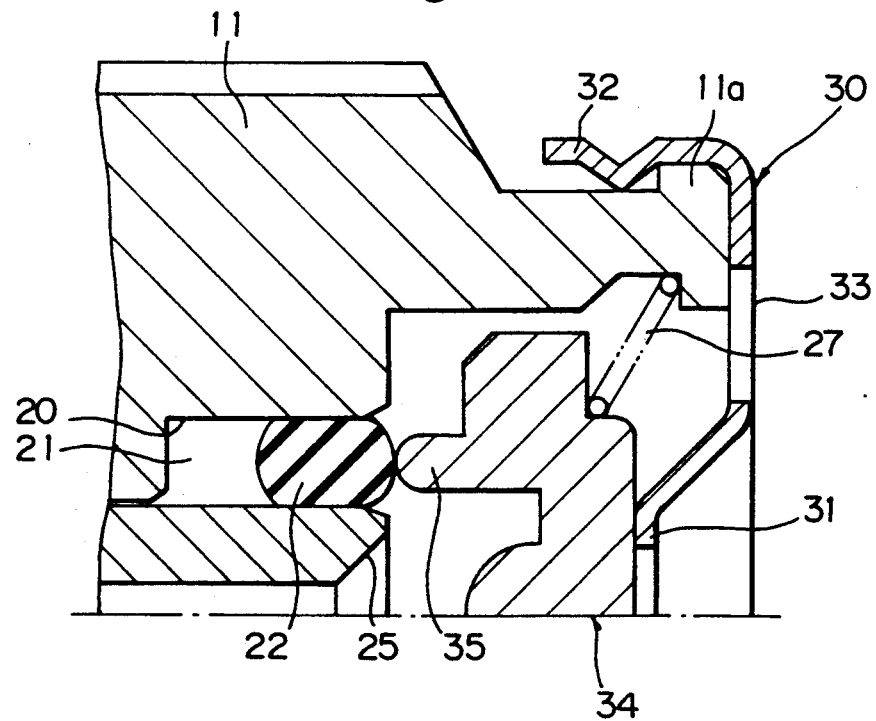
FIG. 5 is an enlarged view of an essential part of the embodiment shown in FIG. 4.

A second embodiment of the present invention will next be described with reference to FIGS. 4 and 5. The second embodiment differs from the first embodiment only in that a projection for positioning the valve member is provided on the cap, and the other portions are the same as in the first embodiment. Accordingly, the same members or portions are denoted by the same reference numerals and a detailed description thereof is omitted.

The cap 30 in this embodiment is formed from a single plate material by press working such that the cap 30 has a positioning projection 31 in the center thereof and a plurality of tongue pieces 32 for caulking around the outer periphery. In addition, the cap 30 is formed with a communicating bore 33 which places the master cylinder and the inlet port 12 in communication when the cap 30 is secured to the body 11. With the projection 31 positioned to project toward the valve member 34, the cap 30 is secured to the body 11 by caulking the tongue pieces 32 to the flange portion 11a of the body 11.

The side of the valve member 34 that is closer to the cap 30 has a flat surface. The arrangement is such that the distal end of the stopper projection 35 is positioned so as to prevent the sealing member 22 from coming out of the annular groove 21 even when the positioning projection 31 abuts the flat surface of the valve member 34, and also before the former comes into contact with the latter.

It should be noted that the hydraulic pressure control valve of the second embodiment functions in the same way as in the first embodiment.

Although the present invention has been described through specific terms, it should be noted here that the described embodiments are not necessarily exclusive and that various changes and modifications may be imparted thereto without departing from the scope of the invention which is limited solely by the appended claims.

What is claimed is:

1. A hydraulic pressure control valve comprising:
   a body that having a bore extending therethrough defining an inlet port and an outlet portion at opposite ends of said body, respectively, and a valve chamber adjacent said inlet port, said inlet port communicating with a master cylinder, said outlet port communicating with a brake cylinder, said body being connected to said master cylinder via a connecting portion that is provided on the outer periphery of said body at a location radially outward from said inlet port;
   a piston axially slidably disposed within said bore, said piston having a small-diameter portion which is disposed at the side of said body on which said inlet port is defined and having a distal end facing toward said inlet port, said small-diameter portion being spaced from an internal surface of said body defining said bore such that an annular groove is defined between said small-diameter portion and said internal surface, a large-diameter portion which is disposed at the side of said body on which said outlet portion is defined, and a communicating bore open at said distal end and which communicating bore places said inlet and outlet ports in communication;
   biasing means for constantly biasing said piston toward said outlet port;
   a sealing member disposed in said annular groove defined between said small-diameter portion and the internal surface of said body defining said bore;
   a valve member disposed within said valve chamber defined adjacent said inlet port;
   biasing means for biasing said valve member to a predetermined position, said valve member coming into and out of contact with the distal end of said small-diameter portion of said piston in response to axial sliding movement of said piston to close and open said communicating bore; and
   a cap secured to the outer periphery of said body at said inlet port, said cap having a through-bore extending therethrough;
   said valve member having a first projection which extends into said annular groove when said valve member is at said predetermined position, and at least one of said valve member and said cap having a second projection through which said valve member can abut said cap when said valve member moves toward said cap, the dimensions of said first and second projections being such that a distal end of said first projection is positioned so as to prevent said sealing member from coming out of said annular groove even when said valve member abuts said cap.

2. A hydraulic pressure control valve according to claim 1, wherein said cap is undetachably secured to said body.

3. A hydraulic pressure control valve according to claim 2, wherein a flange which has a diameter smaller than the outer diameter of said connecting portion is formed on the outer periphery of said body adjacents the end of said inlet port, said cap being secured to said flange by caulking.

4. A hydraulic pressure control valve comprising:
a body having a bore extending therethrough defining an inlet port and an outlet port at opposite ends of said body, respectively, and a valve chamber adjacent said inlet port, and connecting portion means provided on the outer periphery of said body at a location radially outward from said inlet port for facilitating the attachment of the control valve to a master cylinder;
a piston axially slidably disposed within said bore, said piston having a small-diameter portion which is disposed at the side of said body on which said inlet port is defined and having a distal end facing toward said inlet port, said small-diameter portion being spaced from an internal surface of said body defining said bore such that an annular groove is defined between said small-diameter portion and said internal surface, a large-diameter portion which is disposed at the side of said body on which said outlet portion is defined, and a communicating bore open at said distal end and which communicating bore places said inlet and outlet ports in communication;
biasing means for constantly biasing said piston toward said outlet port;
a sealing member disposed in said annular groove defined between said small-diameter portion and the internal surface of said body defining said bore;
a valve member disposed within said valve chamber;
biasing means for biasing said valve member to a predetermined position, said valve member coming into and out of contact with the distal end of said small-diameter portion of said piston in response to axial sliding movement of said piston to close and open said communicating bore; and
a cap secured to the outer periphery of said body at said inlet port, said cap having a through-bore extending therethrough;
said valve member having a first projection which extends into said annular groove when said valve member is at said predetermined position, and at least one of said valve member and said cap having a second projection through which said valve member can abut said cap when said valve member moves toward said cap, the dimensions of said first and second projections being such that a distal end of said first projection is positioned so as to prevent said sealing member from coming out of said annular groove even when said valve member abuts said cap.

5. A hydraulic pressure control valve according to claim 4, wherein said cap is undetachably secured to said body.

6. A hydraulic pressure control valve according to claim 5, wherein a flange which has a diameter smaller than the outer diameter of said connecting portion is formed on the outer periphery of said body adjacent the end of said inlet port, said cap being secured to said flange by caulking.

* * * * *